March 30, 1965 WILBUR-WEBB SELLEY 3,175,295
DEVICE FOR MAKING OPTICALLY CORRECT PERSPECTIVE DRAWINGS
Filed Sept. 13, 1961 5 Sheets-Sheet 1

INVENTOR
WILBUR-WEBB SELLEY
BY Julian C. Renfro
ATTORNEY

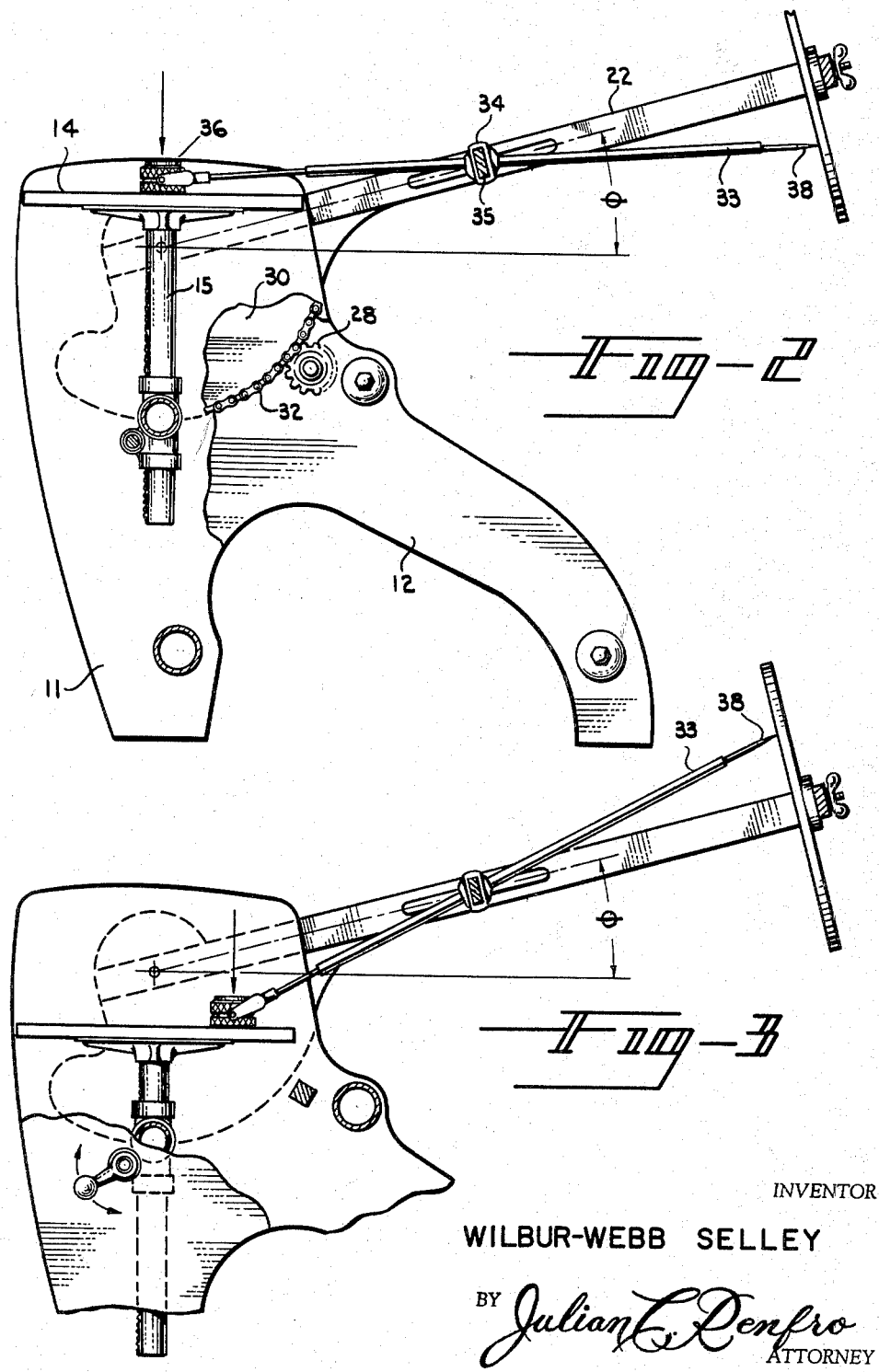

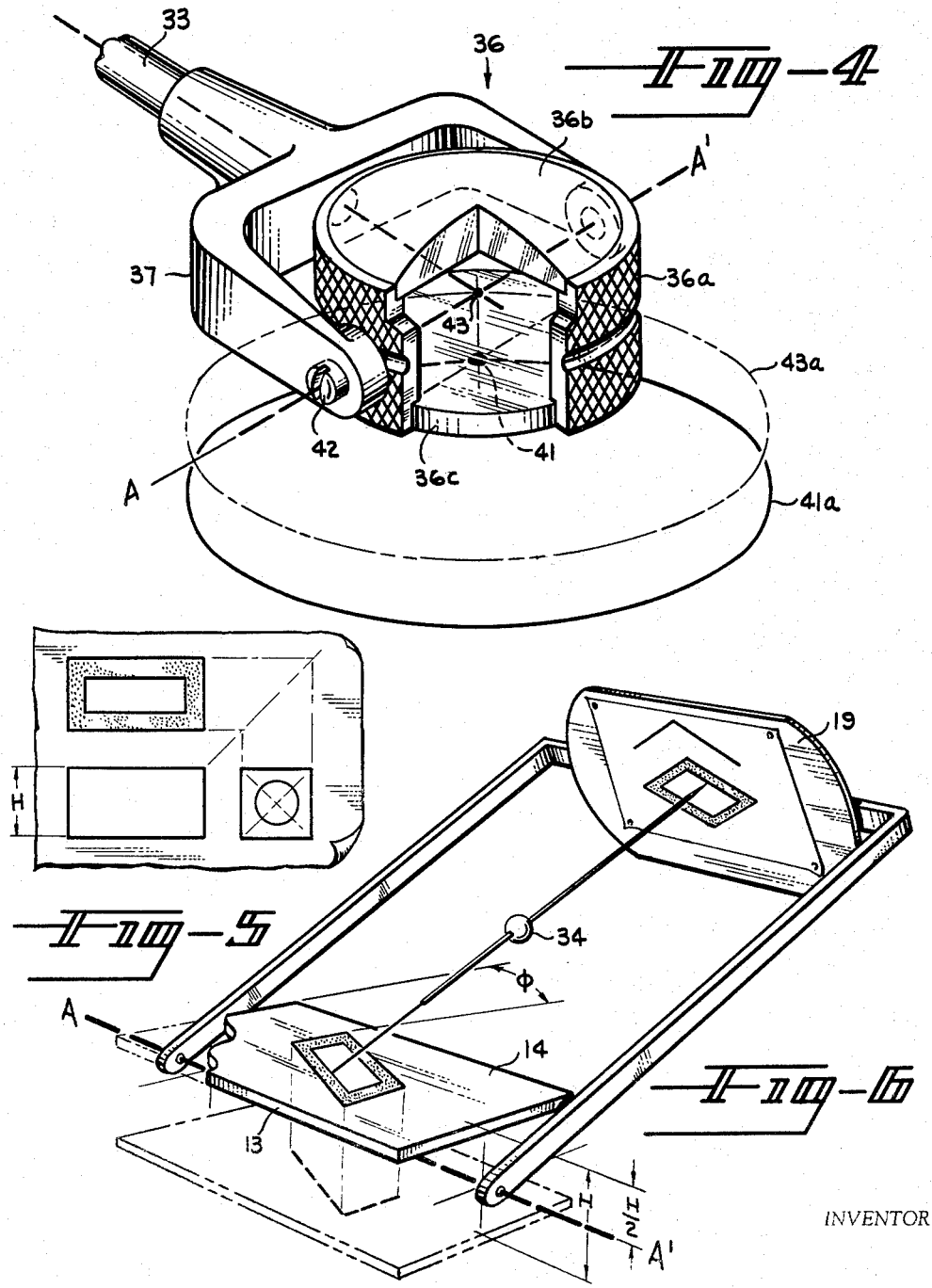

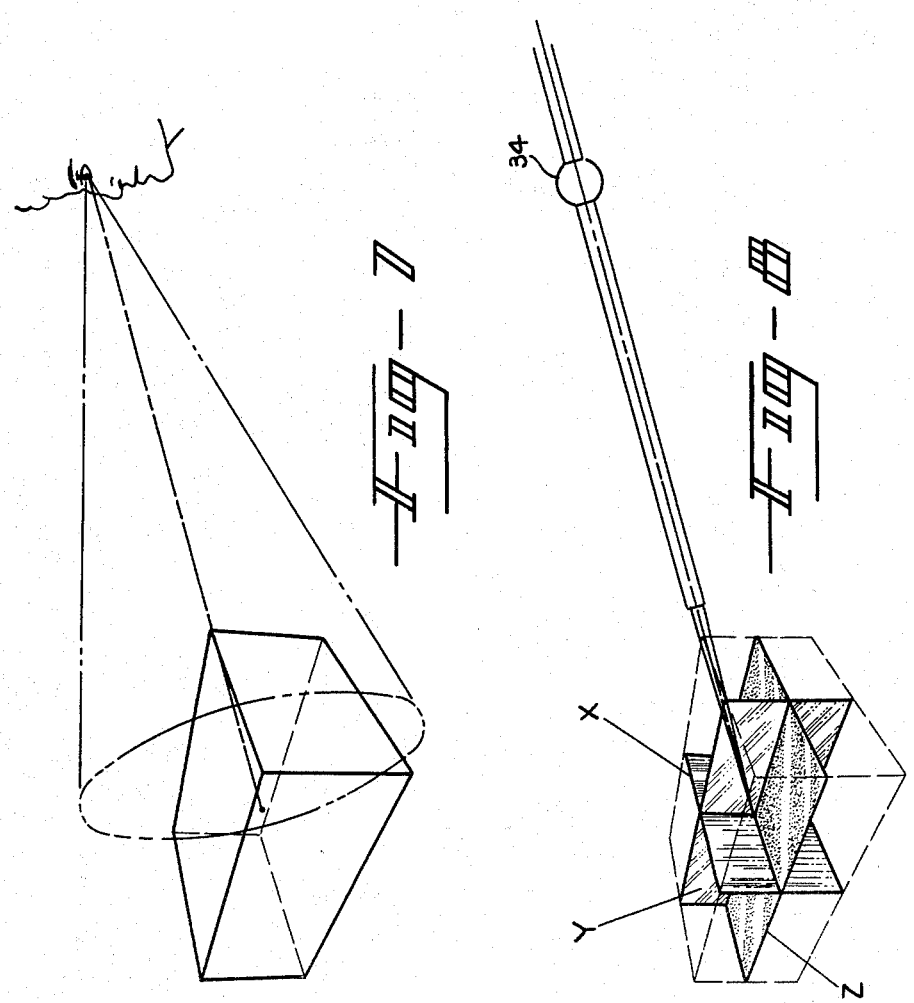

March 30, 1965   WILBUR-WEBB SELLEY   3,175,295
DEVICE FOR MAKING OPTICALLY CORRECT PERSPECTIVE DRAWINGS
Filed Sept. 13, 1961   5 Sheets-Sheet 5
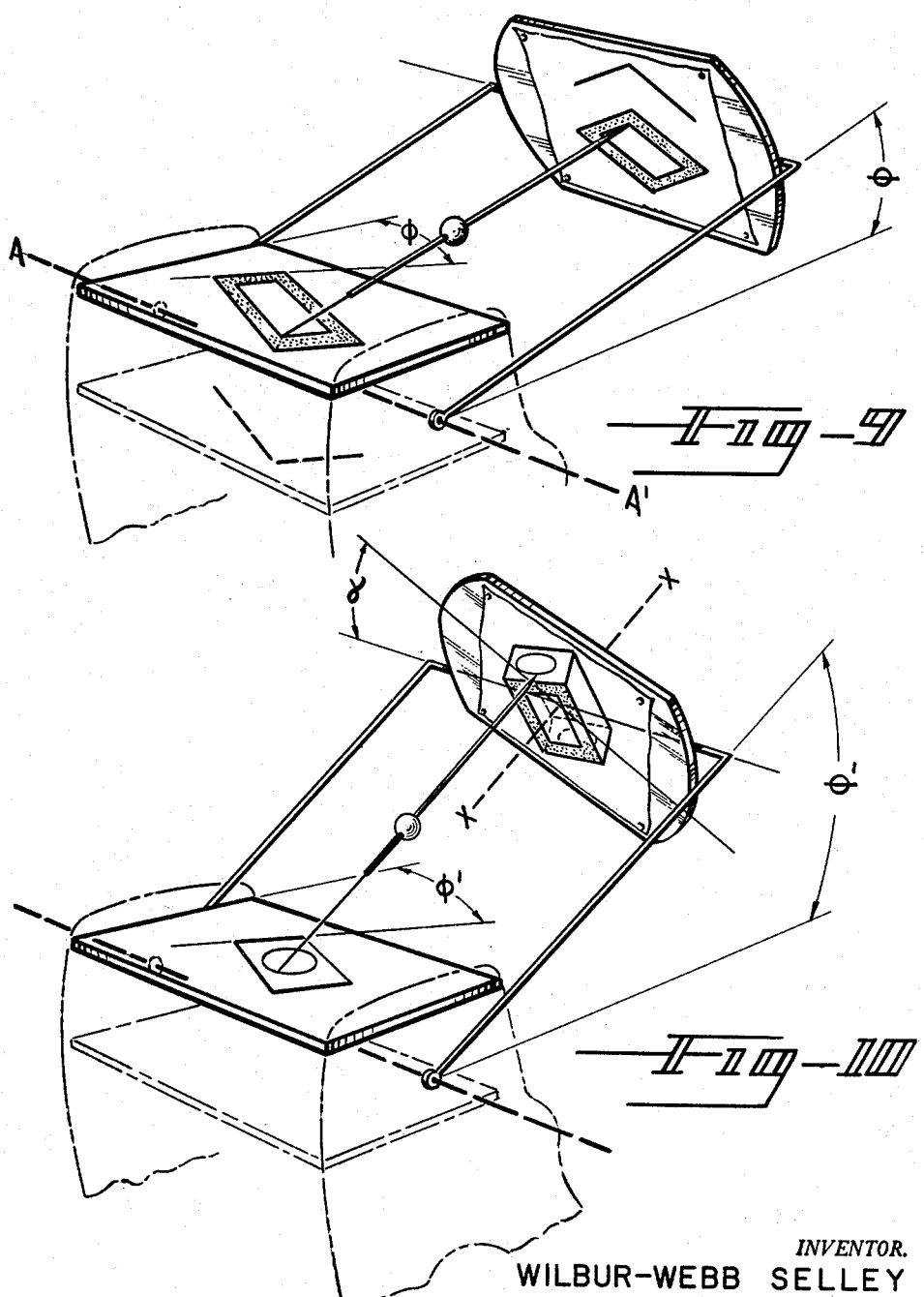
INVENTOR.
WILBUR-WEBB SELLEY
BY
Julian C. Renfro

United States Patent Office 3,175,295
Patented Mar. 30, 1965

3,175,295
DEVICE FOR MAKING OPTICALLY CORRECT
PERSPECTIVE DRAWINGS
Wilbur-Webb Selley, Winter Park, Fla., assignor to
Lomart Manufacturing Corp., Brooklyn, N.Y., a corporation of Delaware
Filed Sept. 13, 1961, Ser. No. 137,878
10 Claims. (Cl. 33—18)

This invention relates to a perspective drawing device, and more particularly to such a device for translating a plurality of related orthogonal views into an optically correct perspective drawing.

Various prior art schemes have been proposed for the creation of perspective drawings, but in each known instance such machines have failed to provide a means for treating with accuracy and convenience the related plan and elevation drawings typically followed in the formulation of perspective drawings. For example, the Hehr Patent No. 2,317,052 teaches the use of certain basic components used for the creation of perspective drawings, but this patentee fails to abide by the disciplines necessary for the creation of optically correct drawings.

The perspective interpretations by such prior art devices are not exact for the several reasons that no sufficient attempt is usually made to maintain the outboard table of such devices perpendicular to the work table upon which drawings to be copied are placed, there is no means for guaranteeing perpendicularity of the tracing means with respect to the outboard table upon which is to be erected, and additionally, the earlier devices failed to guarantee the tracing point, the pivot or eye point, and the drawing point being disposed in one line.

In contrast with this and other schemes which are capable of executing pictorial representations, the present machine gives an exact theoretical interpretation of the disciplines of perspective. I advantageously provide a work table-outboard table relationship wherein the worktable is of selectively adjustable height and the outboard table is supported by a pair of arms whose axis coincides with the geometric center of the work table when the work table is approximately in its median position. These arms support a pivot point in which a sight rod is movably mounted, with one end of the sight rod having means that can be moved about a drawing placed upon the work table, and the opposite end of the sight rod having a marking means for erecting an optically correct drawing upon the outboard table. Inasmuch as the sight rod support moves relatedly with the arms supporting the outboard table, the sight rod point and outboard table in effect function as a unit that is freely movable with respect to the work table. This is the relationship necessary in order that the perspective view created on the outboard table will accurately combine the salient features of these orthogonal views.

In other words, my machine places within the capability of a conventionally trained draftsman the opportunity of constructing drawings of a skill level that formerly was only within the province of highly skilled technical illustrators. This is because the draftsman operating my machine can by selectively adjusting the height of his work table, create by the use of the relatedly movable sight rod-outboard table arrangements, a plurality of related figures on the outboard table from a first orthogonal view, which figures bear a proper interrelation dependent on the height of the object being represented. Then, a different orthogonal view of the object can be placed upon the work table, and the correct sighting angle for analyzing and tracing this view achieved simply by rotating the sight rod-outboard table unit for an appropriate number of degrees with respect to the geometric center of the work table in order that a complementary portion of the perspective drawing can be obtained.

This is to say, the pivot point of the sight rod represents a viewing means for viewing the work table, so that by changing the angle of this means with respect to the work table, I am in effect changing the angle that any drawing mounted upon the work table can be viewed. Thus it follows that by height adjustments of the work table, we can conveniently project the top and bottom planes of a view being first considered, such as a plan view. Then, by changing the angle of the arms, which actually changes the angle of the "viewing means," the operator has the capability of treating with equal convenience the side elevations of the subject drawings, with the resulting perspective view being a highly accurate composite drawing.

These and other objects, features and advantages of this invention will be apparent from a study of the enclosed drawings in which:

FIGURE 2 is a side elevation view of my machine, with the work table height being shown to be above a median position;

FIGURE 3 is a view similar to FIGURE 2 but with the work table moved to a position below a median, and with the sight rod or projection means of the machine shown moved to different positions upon the tables of the machine;

FIGURE 4 is a perspective view, to a larger scale, of the sight glass portion of the projection means, with portions thereof removed for clarity;

FIGURE 5 represents three related orthographic views provided for illustrative purposes;

FIGURE 6 illustrates how one of the orthographic views of FIGURE 5 can be traced by my machine with the work table disposed at two different heights, but with the viewing angle afforded by the projection means and outboard table remaining unchanged;

FIGURE 7 is a conceptual view of the manner in which a human eye views a box-like object;

FIGURE 8 represents the approximate manner in which my machine enables a mechanical analog of the FIGURE 7 arrangement to be obtained;

Figure 1:
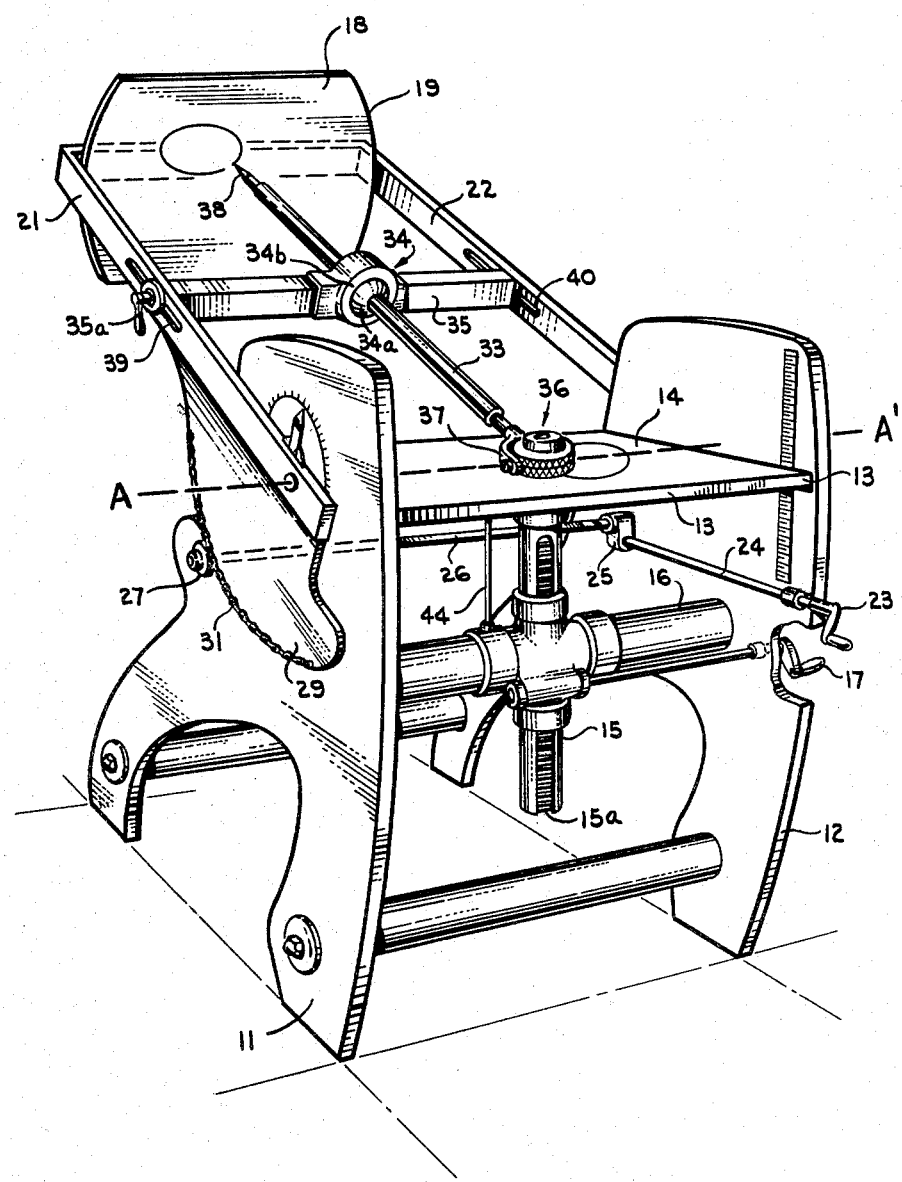
FIGURE 1 is a perspective view of a drawing machine according to my invention, in which the sight angle at which a work table drawing is viewed can be varied for the effective production of perspective drawings.

FIGURE 9 illustrates in somewhat schematic form how a first orthographic view can be utilized, with the outboard table arm angle remaining constant in at least two different work table adjustment heights to obtain carefully related portions of a perspective drawing; and FIGURE 10 represents how a second relatable orthographic view can be placed upon the work table, and then how by appropriate change in the angle of the outboard table supporting arms and by certain orientation adjustments, a second significant portion of the perspective drawing can be brought about in proper relation to the first portion of the perspective created upon the outboard table.

Referring to FIGURE 1, an overall view of my perspective drawing machine 10 is there shown, the machine utilizing a pair of spaced, relatively stationary side frames 11 and 12. Disposed between the side frames is work table 13 which is movable with respect to the side frames in a direction perpendicular to its working surface 14. Work table 13 may for example be supported by a centrally disposed pedestal 15, which is movable with respect to a table supporting member 16 extending between the side frames, and secured thereto. A hand crank 17 is provided for bringing about height adjustments of the work table, which may for example be brought about by a rack and pinion arrangement, with handle 17 rotating the pinion disposed in the central portion of member 16, that meshes with a rack 15a disposed longitudinally upon the pedestal 15. This arrangement makes it possible for an operator seated at work table 13 between members 11 and 12 to easily bring about height adjustments of the work table as such are required during the construction of drawings, hereinafter described in greater detail. Suffice it to say that a reference view is to be placed upon the surface 14 of table 13, and the operator by working therefrom can create rapidly an optically correct perspective drawing upon paper disposed upon the working surface 18 of outboard table 19.

Outboard table 19 is supported by arms 21 and 22 in fixed relation, with the end of these arms remote from outboard table 19 being pivotally supported from side frames 11 and 12. The arms 21 and 22 can be pivoted from a substantially horizontal position, about their axis A—A' for approximately 90° to a substantially vertical position. Inasmuch as the surface 18 is perpendicular to a center line extending from the arm axis A—A' to the table 19, the surface 18 of table 19 is in a substantially vertically extending position when the longitudinal axis of the arms is horizontal, and in a horizontal plane when the arms have been pivoted 90° to a vertical position.

It is the angularity between the working surfaces of tables 13 and 19 that controls the perspective angle of the drawings to be created upon paper secured to surface 18 of table 19. A hand crank 23 is utilized for bringing about the rotation of arms 21, 22 about axis A—A' and for example hand crank 23 may turn, via rod 24, a worm drive unit 25 which turns a shaft 26 extending between the side frames 11 and 12. Gears 27 and 28 are located upon shaft 26, and are arranged to mesh with a form of gear teeth disposed along curved quadrant surfaces 29 and 30 of arms 21 and 22 respectively. As may be seen in FIGURES 1 and 2, lengths of roller chain 31 and 32 stretched along curved surfaces 29 and 30 and secured thereto may form the teeth to mesh with gears 27 and 28. Therefore, as the operator turns crank 23 in a desired direction, the arms will be caused to rotate so as to increase or decrease as the case may be, the angularity between the working surfaces of tables 13 and 19. A worm drive unit is not required, although it is desirable that a type of drive be used that will prevent the weight of the arms from turning the crank 23.

A sight rod 33 is pivotally mounted at a point 34 midway between the tables, hereinafter called the eye point and it is by manipulations of this rod that an operator can create from a plan view or side elevational view placed upon table 13, a perspective view on table 19. Sight rod 33 is preferably disposed in a pivot joint 34 in the form of a ball 34a movable for a substantial number of degrees with respect to an encircling ring 34b. Ball 34a has a centrally disposed hole, through which rod 33 extends. Pivot joint 34 may be supported from the arms 21, 22 by means of a member 35 extending between the arms, and because of this arrangement, as the arms 21, 22 are rotated about axis A—A', the rod 33 basically moves in accordance therewith, although the rod of course remains pivotable about point 34 in each new rotative position of the latter.

Sight glass 36 is supported in a clevis 37 that is slidably disposed in the end of sight rod 33 nearest the operator, and rests upon the surface 14 of the work table. A stylus 38 in the form of a pen, pencil or other marking instrument is disposed upon the outboard end of the sight rod 33. As will be obvious to those skilled in the art, when the operator moves the sight glass 36 about the surface of the work table, a corresponding movement of the stylus 38 about the outboard table takes place, although of course a left for right and up for down reversal has occurred.

The sight glass 36 is revealed in detail in FIGURE 4, wherein it is shown to comprise an encircling ring member or housing 36a, and supported therein a lens 36b whose focal point lies in the plane of the paper. The operator seated at the machine looks through the lens 36b when guiding the sight glass about the significant lines of the drawing being followed or "traced." To aid the operator in accurately following the lines of a drawing, a lower glass 36c containing a reticle 41 is employed, the latter being preferred over a cross hairs arrangement. A small light bulb (not shown) may be used to provide illumination between the lens 36b and the glass 36c, if such be desired.

The ring member 36a may be rotatably disposed between the arms of the clevis 37, such as by being supported by pins 42 having threads and a screw head thereon. The free support of the sight glass by the pins 42 enables the lower glass 36c to rest flat upon the drawing disposed upon work table surface 14, despite movements of sight rod 33 about the eye point 34, and the rotative orientations of the sight rod and arms 21, 22 about the axis A—A'.

The stylus 38 is preferably carried in a telescopic manner in the end of the sight rod, and biased into firm contact with the surface 18 of the outboard table 19. This construction is desirable inasmuch as when the sight glass is moved by the operator from a central position on the surface of the table to the near left corner of the work table the stylus 38 is moved to the upper right hand corner of the outboard table 19, and in so doing, the tip of the stylus must necessarily increase its distance from the pivot point or eye point 34. The extension of the stylus so as to remain in firm contact with the outboard table during all movements of the sight rod is of course made possible by the aforementioned biased telescopic arrangement. A rod 44 mounted on the underside of table 13, which rod is slidable in member 16, may be used to prevent undesirable rotation of pedestal 15 in the hole in member 16 that receives the pedestal.

It should be noted at this point that one of the important parameters of this invention involves the fact that when a one to one relaitonship exists between the drawings located upon the tables 13 and 19, and when the table 13 is in a certain middle position approximately midway between its upper and lower extreme positions, the eye point 34 must necessarily lie at the midpoint of a line connecting the geometric centers of the two tables. Another important parameter involves the fact that when the sight glass 36 is placed upon the geometric center of the surface 14 of table 13, and the table is in its middle position, the stylus tip will not be disturbed from its corresponding position on the geometric center of surface 18 despite the fact that the arms 21, 22 are pivoted over a wide range.

Inasmuch as the sight glass 36 and its supporting clevis 37 are of finite thickness, it is the axis of the clevis pins 42 that must be regarded as having a "median" position, in which it is properly aligned upon axis A—A'. Therefore, the surface 14 of the work table, when it is in its "middle" position, must necessarily be disposed slightly below the position corresponding to the median position of its motion, but because this fact is taken into account in the basic construction of my drawing machine, this causes no difficulty in the uses of the machine, or any distortion in the results.

While the operator moves sight glass reticle 41 about any particular silhouette or outline located on the work table 13, the point 43 corresponding to the intersection of the axis of the clevis pins 42 and the axis of the sight rod 33 describes an identical silhouette in space directly above the work table. Note ellipses 41a and 43a appearing in FIGURE 4. Therefore, it should now be clear that when work table 13 is disposed in its middle position, it is the clevis pin axis that lies upon axis A—A', and the surface 14 resides "clevis height" below the axis of the arms 21, 22.

In order to best visualize why it is important according to my invention that the work table 13 be adjustable to different elevations with respect to axis A-A' while the angle $\theta$ of the arms is maintained constant as shown in FIGURES 2 and 3, it is helpful to consider the manner in which my invention is typically used. If for example, a perspective drawing of a box-like rectangular solid is to be created on the outboard table from the typical orthographic views shown in FIGURE 5, the plan view of FIGURE 5 is centered upon the surface 14 of the work table, as shown in FIGURE 6, with the center of the plan view coinciding with the geometric center of the work surface 14. The particular view selected is a matter of choice but the view selected must be aligned with the center of the work surface 14, which alignment may be simplified by the use of a centrally disposed hole in the work surface 14 into which hole a thumb tack penetrating the center of the plan view may be inserted. For aesthetic reasons the view is typically rotated out of parallelism with the edges of the table 13 and this establishes one of the perspective angles hereafter referred to as $\phi$, as seen in FIGURE 6.

Depending upon the height H of the sides of the box to be drawn on the paper disposed on the surface 18 of the outboard table, the table is raised above its middle position for a distance of half that height or a distance $H/2$ above axis A-A', with the operator then moving the reticle 41 of the sight glass 36 about significant lines of the view so as to cause the stylus 38 to draw a parallelogram type figure on the outboard table 19. The table is then moved an equal distance of $H/2$ below the median position of the clevis pins, and at this time the operator traces the periphery of the box with his sight glass to furnish the base line of the drawings. This causes a portion of a second parallelogram type figure to be created parallel to but spaced from the first figure of this type. In the case of a simple figure, it is now necessary only to interconnect the corresponding corners of the figures on the paper on the outboard table in order to achieve an optically correct version of the box.

It should be noted that this perspective view now created is symmetrically disposed with respect to point 34, or in other words the perspective figure appears in the precisely correct manner that it should appear to an eye ball located at point 34. It is because of this that I prefer to call the point 34 the eye point, and the rod 33 a sight rod. The movements of the table the correct distance above and below the median point insure the optically correct disposal of the base line and upper lines of the box with respect to the center of the paper upon which the perspective drawing is being created. As hereinbefore mentioned, the perspective angle may be changed merely by appropriate initial movements of the arms 21, 22. A selected corner of the box may be brought to the front of the drawing merely by the proper initial rotation of the plan view being worked from. If desired, it is possible to complete the perspective view of the employment of another view of the box, if of course the other view is drawn to the same scale as the first and if it is properly centered upon surface 14. For example, the circle appearing in the end elevational view of the box of FIGURE 5 can be added to the perspective drawing by properly placing and aligning the end elevational view upon the surface 14. If the end view is properly placed, the operator by tracing it with his sight glass can cause the correct placement of same in the perspective drawing, this being true only if the angle of the arms 21, 22 has been changed, and if the view has been oriented to a new angle on the board. The reason for the necessity of changing the angle of the arms will now be discussed.

FIGURE 7 represents a person viewing a three dimensional box-like object, with the center of the box shown to be lying in the axis of the cone of vision. The human eye has the ability to resolve all the other points on the object into an integrated image known as a perspective.

FIGURE 8, similarly, represents a mechanical analog of the efforts of the human eye in this regard. This figure demonstrates how it is possible in the device according to my invention to interchange conveniently plan and elevation views about the focal point or center of the box-like object where all three central coordinate planes intersect.

As will be apparent, each of the three planes will be seen from a different viewing angle, this being the angle between the sight rod axis and the plane of the work table. Each viewing angle is directly derivable from the original $\theta$ and $\phi$ which were arbitrarily set into the machine according to the aesthetic dictates of the operator.

In other words, if an eyeball is disposed at point 34 and looking at the box-like object, it will be looking at the focal point of the three coordinate planes, which point may be regarded as residing at the median position of the table during the analysis of any one system of views.

Since this point is common to all three coordinate planes, my device is in effect duplicating this unique point, enabling a shift from one system of coordinate planes to another, and the treatment of an entire system of parallel planes that are successively disposed upon the variable height work table 13 for analysis, provided the correct viewing angle $\theta'$ is utilized each time that a new system of parallel planes is to be observed.

The new viewing angle $\theta'$ can be established from the formula:

$$\text{Sin } \theta' = \sin \phi \cos \theta$$

FIGURE 10 represents the settings necessary to be placed in the machine according to my invention to enable the proper treatment of the supporting elevation view, with it being necessary to change the arm angle from $\theta$ to $\theta'$ and the lateral angle from $\phi$ to $\phi'$.

In addition to this it may be desirable to rotate the outboard table by an angle $\gamma$ about its center point to properly locate the portion of the drawing now to be projected, relative to the portions of the drawing previously made. A suitable adjustment clamp enables the operator to loosen the setting of the outboard table and then tighten it in the desired position. Alternatively, the outboard table may be rigidly attached to said arms at all times with only the paper taped or otherwise secured to the outboard table being moved in order to accomplish the desired change in orientation.

As will be apparent to those skilled in the art, a number of ancillary devices may be employed for the draftman's convenience. For example, I may utilize a noback device in the linkage of crank 17 to keep the table 13 "locked" so that weight thereon will not cause it to move from a desired setting. A scale position on the inside wall of side frame 12 may be employed so that the operator can effect exact settings of work table height, whereas a protractor may be mounted about the axis A-A' to measure the viewing angle $\theta$.

A reasonably skilled draftman can quickly become quite proficient in the use of my device and execute drawings of a level of excellence heretofore unobtainable.

I am not to be limited to the embodiments of my invention shown herein except as required by the scope of the appended claims.

I claim:

1. A perspective drawing machine for the rapid execution of optically correct perspective drawings from at least one orthographic projection, comprising a work table for receiving views to be copied, an outboard table to which a perspective drawing of the view may be transferred, means for supporting said outboard table in such a manner with respect to said work table that the height relation between the work-receiving surfaces of said tables as well as the angular relation between said surfaces can be selectively varied, and means supported by said outboard table supporting means for transferring the intelligence from said work table to said outboard table, said intelligence transferring means being essentially perpendicular to said outboard table and together therewith in effect serving as a type of viewing and recording means, whereby a perspective view having a desired perspective angle may be created from an orthographic projection.

2. A perspective drawing machine as defined in claim 1 in which said intelligence transferring means comprises a sight rod having a support point which moves in accordance with movements of said outboard table, and with respect to which support point said rod is movable, said sight rod having means thereon for tracing the significant lines of the orthographic projection, and stylus means generally perpendicular to said outboard table for erecting thereon the perspective view.

3. A perspective drawing machine for the rapid execution of optically correct perspective drawings from at least one orthographic projection, comprising a work table having a working surface upon which an orthographic view to be traced may be received, said work table being movable along an axis perpendicular to the plane of its surface to positions above and below a median position, an outboard table rotatably supported in approximately equidistant relation to said work table, said outboard table having a working surface upon which a perspective drawing can be erected, and whose angularity with respect to said work table can be varied, thus to enable the angle of perspective to be selectively varied, and intelligence transferring means generally perpendicular to said outboard table and movable in accordance with the motion of said outboard table about said work table, said intelligence transferring means being capable of erecting a perspective view on said outboard table in accordance with the details of the orthographic projection and the angular relation between said tables, the movement capability of said work table perpendicular to its surface enabling a plurality of essentially parallel views of the same perspective to be created on said outboard table, the variability of the viewing angle said outboard table makes with said work table enabling a plurality of different yet relatable orthographic views to be utilized for the creation of a perspective view containing the intelligence from the several orthographic views.

4. A perspective drawing machine for the rapid execution of optically correct perspective drawings from at least one orthographic projection, comprising a work table having a working surface, said working surface having a geometric center with respect to which an orthographic view to be traced may be received, said work table being movable along an axis perpendicular to the plane of its surface to positions above and below a median position, an outboard table having a working surface thereon upon which surface a perspective drawing may be projected, latter table being supported by a pivotally mounted support means whose pivot axis extends in the plane of said work table and approximately through the geometric center of the working surface of said work table when latter is in a median position, said outboard table support means maintaining the working surface of said outboard table directed substantially toward the working surface of said work table at all times throughout a range of angular movements of said outboard table about said pivot axis, said outboard table support means also supporting a projection means for communicating intelligence from said work table to said outboard table, said projection means being supported at a point located between said tables and movable concomitantly with said outboard table support means, tracing means supported upon said work table by said projection means for tracing the significant lines of orthogonal views placed upon said work table, marking means supported adjacent said outboard table by said projection means for erecting a perspective drawing upon latter table as said tracing means is moved about the view placed upon said work table, the adjustable height of said work table enabling a first orthographic view to be traced and thereby placed in perspective at a desired location upon said outboard table, with any additional tracings of that orthographic view being accomplished at a different work table height, but at the same angle of the outboard table with respect to the working surface of said work table, the angular capability of said outboard table with respect to the working surface of said work table enabling the sight angle at which subsequent related orthographic views to be traced, to be changed in order that other portions of said perspective view, correlatable with the first created portion can be brought about, whereby the use of two or more orthographic views can produce an optically correct perspective view of great authenticity.

5. A perspective drawing machine for the rapid execution of optically correct perspective drawings from related plan and elevation views comprising a fixed frame having spaced structural sides, a work table disposed between said sides and movable perpendicularly to its plane into an infinite number of parallel positions between upper and lower extreme positions, an outboard table upon which perspective drawings are to be projected, a pair of movable outrigger arms for supporting said outboard table in fixed relationship to said arms, each of said arms being pivotally supported from a respective side of said frame, the pivot axes of said arms being coincident with and lying in the plane of said work table when latter table has been moved to a median position intermediate its upper and lower extreme positions, said pivot axis passing approximately through the geometric center of said work table substantially parallel to two sides of latter table, said outrigger arms being rotatable about said pivot axis for an infinite number of positions between two extreme positions, an extensible rod extending between said work table and said outboard table, sighting means at one end of said rod and drawing means at the other end thereof, supporting means for said rod located approximately midway along the length of said rod and in turn being supported by said outrigger arms, said supporting means including a pivot point lying in the axis of said extensible rod about which said rod is freely pivotal, whereby as said sighting means is moved about upon said work table, said drawing means is proportionately moved about on said outboard table to create a drawing whose perspective was selected by the positioning of said tables.

6. A perspective machine as defined in claim 5 in which said supporting means may be adjusted toward or away from said work table, thereby to bring about a change in the size ratio between the drawings upon said tables.

7. A perspective drawing machine for the rapid execution of optically correct perspective drawings from orthographic projections comprising a work table movable perpendicularly to the plane of its surface, said work table having a geometric center on its surface, with respect to which an orthographic drawing may be received, said work table being selectively adjustable into any of a number of parallel positions on either side of a median position, sighting means disposed upon the surface of said work table and being movable thereabout over the significant lines of an orthographic drawing placed thereon, an outboard table having a working surface upon which perspective drawings may be created, latter table being rotatable between a number of selected positions that are substantially equidistant from an axis residing parallel to the surface of said work table, which axis passes through said sighting means when latter is disposed in the geometric center of the surface of said work table and said work table has been adjusted to its median position, the working surface of said outboard table being directed toward said work table at all times, throughout its range of selected portions, a sight rod pivotally supported intermediate its ends at a location between said tables and movable concomitantly with rotative movements of said outboard table, one end of said rod supporting said sighting means, and the other end supporting marking means disposed in contact with said working surface of said outboard table, the pivotal support of said sight rod rotating with said outboard table as latter is moved about the axis of movement of said outboard table, whereby perspective drawings having a desired perspective angle can be created from related orthographic projections.

8. A perspective drawing machine for the rapid execution of optically correct perspective drawings comprising a work table having a working surface adapted to receive an orthographic projection to be copied, said work table being movable along an axis perpendicular to the plane of its working surface to positions above and below a median position, an outboard table having a working surface upon which a perspective drawing may be created, latter table being supported by a pair of pivotable arms whose pivot axis is disposed in the plane of said work table when said table is in its median position, elongated projection means supported by said arms at a location intermediate said tables so as to be essentially perpendicular to said outboard table, means on one end of said projection means for tracing a drawing placed upon said work table, and means on the opposite end of said projection means for erecting at said outboard table a perspective view of the drawing placed upon said work table, pivotal movements of said arms about said pivot axis altering the angle said outboard table bears to said work table, as well as moving said projection means a commensurate amount, whereby no distortion of the view created on said outboard table occurs.

9. A device for creating optically correct perspective drawings comprising a work table and an outboard table, said work table adapted to receive, at a centrally disposed location thereon, a view to be copied, a pair of arms for supporting said outboard table in various selected angular relationships with respect to said work table, the pivot axis of said arms being disposed essentially in the plane of said work table and passing through approximately the center point of said work table, elongated projection means supported by said arms at a position intermediate said table, means on one end of said projection means for tracing the lines of the view on said work table, marking means on the other end of said projection means for creating a perspective view at said outboard table of the view on said work table, whereby said marking means is always in a substantially constant relationship to said outboard table despite pivotal movement of said arms to change the angle of perspective.

10. The device as defined in claim 9 in which said outboard table is selectively rotatable with respect to said arms.

References Cited by the Examiner
UNITED STATES PATENTS

| | | | |
|---|---|---|---|
| 2,317,052 | 4/43 | Hehr | 33—18 |
| 2,419,078 | 4/47 | Ivy | 33—24 |
| 2,746,152 | 5/56 | Deakin | 33—18 |

ISAAC LISANN, *Primary Examiner.*